United States Patent
Nagasaka et al.

(10) Patent No.: US 9,668,202 B2
(45) Date of Patent: May 30, 2017

(54) COMMUNICATION CONTROL METHOD, USER TERMINAL, AND PROCESSOR

(71) Applicant: KYOCERA CORPORATION, Kyoto (JP)

(72) Inventors: Yushi Nagasaka, Yokohama (JP); Masato Fujishiro, Yokohama (JP); Kugo Morita, Yokohama (JP); Chiharu Yamazaki, Ota-ku (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/890,370

(22) PCT Filed: May 8, 2014

(86) PCT No.: PCT/JP2014/062372
§ 371 (c)(1),
(2) Date: Nov. 10, 2015

(87) PCT Pub. No.: WO2014/181832
PCT Pub. Date: Nov. 13, 2014

(65) Prior Publication Data
US 2016/0112937 A1    Apr. 21, 2016

(30) Foreign Application Priority Data
May 10, 2013 (JP) ................................. 2013-100781

(51) Int. Cl.
*H04W 4/00* (2009.01)
*H04W 48/16* (2009.01)
(Continued)

(52) U.S. Cl.
CPC ........... *H04W 48/16* (2013.01); *H04W 16/32* (2013.01); *H04W 24/10* (2013.01); *H04W 48/04* (2013.01);
(Continued)

(58) Field of Classification Search
CPC ..... H04W 48/16; H04W 48/18; H04W 48/04; H04W 16/32; H04W 24/10; H04W 84/042; H04W 84/12; H04W 84/045
(Continued)

(56) References Cited

U.S. PATENT DOCUMENTS 7,251,490 B2 * 7/2007 Rimoni ............. H04W 36/0061
370/331
2008/0137626 A1    6/2008 Choi et al.
(Continued)

FOREIGN PATENT DOCUMENTS

JP    2011-511496 A    4/2011
WO   2012/074325 A2   6/2012

OTHER PUBLICATIONS

International Search Report issued in PCT/JP2014/062372, mailed Jun. 17, 2014.
(Continued)

*Primary Examiner* — Khai M Nguyen
(74) *Attorney, Agent, or Firm* — Studebaker & Brackett PC (57) ABSTRACT

A communication control method according to the present invention is a method for allowing a cellular communication system to cooperate with a wireless LAN system. The communication control method comprises: a detecting step of detecting, by a user terminal having a cellular communication unit and a wireless LAN communication unit, that the user terminal is present near a small-cell base station; a recognizing step of recognizing, by the user terminal, that the small-cell base station is of a collocated type where the small-cell base station is disposed at a same location as a wireless LAN access point; and a scanning starting step of starting, by the user terminal, scanning for discovery of the wireless LAN access point, when the user terminal has recognized that the small-cell base station is of the collo-
(Continued)

cated type and has not discovered the wireless LAN access point.

10 Claims, 9 Drawing Sheets

(51) Int. Cl.
*H04W 16/32* (2009.01)
*H04W 24/10* (2009.01)
*H04W 48/04* (2009.01)
*H04W 84/12* (2009.01)
*H04W 48/18* (2009.01)
*H04W 84/04* (2009.01)

(52) U.S. Cl.
CPC ......... *H04W 84/045* (2013.01); *H04W 84/12* (2013.01); *H04W 48/18* (2013.01); *H04W 84/042* (2013.01)

(58) Field of Classification Search
USPC ................ 455/434, 435.1, 432.1, 435.2
See application file for complete search history.

(56) References Cited

U.S. PATENT DOCUMENTS

| | | | | |
|---|---|---|---|---|
| 2010/0278164 | A1* | 11/2010 | Hedberg ............... | H04W 48/10 370/338 |
| 2014/0204927 | A1* | 7/2014 | Horn ...................... | H04W 8/26 370/338 |
| 2015/0004969 | A1* | 1/2015 | Han .................. | H04W 52/0251 455/434 |

OTHER PUBLICATIONS

Written Opinion issued in PCT/JP2014/062372, mailed Jun. 17, 2014.
3GPP TSG-RAN WG2 Meeting #81-BIS, R2-131384, Apr. 15-19, 2013, Chicago, United States, Broadcom Corporation, Air-Interface Enhancement Proposals for WLAN/3GPP Radio Interworking.
3GPP TSG-RAN Meeting #57, RP-1201455, Chicago, USA, Sep. 13-15, 2012, Intel Corporation, New Study Item Proposal on WLAN/3GPP Radio Interworking.
Extended European Search Report (EESR) issued in corresponding EP 14795344.2-1854, mailed Dec. 7, 2016; 15 pp.
Intel Corporation; 3GPP TSG-RAN2 Meeting #81-BIS, R2-131340, Apr. 15-19, 2013, Chicago, United States, Email discussion report on WLAN/3GPP radio interworking scenarios; 8 pp.

* cited by examiner

COMMUNICATION CONTROL METHOD, USER TERMINAL, AND PROCESSOR

TECHNICAL FIELD

The present invention relates to a communication control method, a user terminal, and a processor for allowing a cellular communication system to cooperate with a wireless LAN system.

BACKGROUND ART

In recent years, the proliferation of a user terminal having a cellular communication unit and a wireless LAN communication unit (so-called dual terminal) has progressed. In addition, there has been an increase in the number of wireless LAN access points (hereinafter, referred to as "access points") which are managed by an operator of a cellular communication system.

Hence, 3GPP (3rd Generation Partnership Project) which is a cellular communication system standardization project is scheduled to consider a technique capable of enhancing cooperation between a cellular communication system and a wireless LAN system (see Non Patent Literature 1).

Meanwhile, when a user terminal performs data communication in a wireless LAN system (hereinafter, referred to as "wireless LAN communication"), the user terminal performs scanning to discover an access point. The user terminal having discovered an access point by the scanning establishes a connection with the access point and thereby performs wireless LAN communication.

PRIOR ART DOCUMENT

Non-Patent Document

Non-Patent Document 1: 3GPP Contribution RP-1201455

SUMMARY OF THE INVENTION

However, if a user terminal that desires wireless LAN communication cannot discover an access point, the user terminal needs to continuously perform scanning. Thus, there is a problem that wasted scanning is performed.

The present invention is therefore to provide a communication control method, a user terminal, and a processor that allow a user terminal having a cellular communication unit and a wireless LAN communication unit to efficiently discover an access point.

According to an embodiment, a communication control method for allowing a cellular communication system to cooperate with a wireless LAN system. The communication control method comprises: a detecting step of detecting, by a user terminal, that the user terminal is present near a small-cell base station; a recognizing step of recognizing, by the user terminal, that the small-cell base station is of a collocated type where the small-cell base station is disposed at a same location as a wireless LAN access point; and a scanning starting step of starting, by the user terminal, scanning for discovery of the wireless LAN access point, when the user terminal has recognized that the small-cell base station is of the collocated type and has not discovered the wireless LAN access point.

A communication control method, a user terminal, and a processor according to the present invention allow a user terminal having a cellular communication unit and a wireless LAN communication unit to efficiently discover an access point.

DESCRIPTION OF THE EMBODIMENT

[Overview of Embodiment]

A communication control method according to the first embodiment and the second embodiment is a method for allowing a cellular communication system to cooperate with a wireless LAN system. The communication control method comprises: a detecting step of detecting, by a user terminal, that the user terminal is present near a small-cell base station; a recognizing step of recognizing, by the user terminal, that the small-cell base station is of a collocated type where the small-cell base station is disposed at a same location as a wireless LAN access point; and a scanning starting step of starting, by the user terminal, scanning for discovery of the wireless LAN access point, when the user terminal has recognized that the small-cell base station is of the collocated type and has not discovered the wireless LAN access point.

In the communication control method according to the first embodiment, in the recognizing step, the user terminal recognizes that the small-cell base station is of the collocated type, based on a collocation list about a small-cell base station of the collocated type.

In the communication control method according to the first embodiment, in the detecting step, the user terminal detects that the user terminal is present near the small-cell base station, by receiving a cell identifier from the small-cell base station, and in the recognizing step, the user terminal recognizes that the small-cell base station is of the collocated type, when the cell identifier matches a cell identifier included in the collocation list.

In the communication control method according to the first embodiment, in the detecting step, the user terminal detects that the user terminal is present near the small-cell base station, based on location information included in a whitelist about a specific cell to which the user terminal has an access right, and in the recognizing step, the user terminal recognizes that the small-cell base station is of the collocated type, when a cell identifier included in the whitelist matches a cell identifier included in the collocation list.

The communication control method according to the first embodiment further comprises an obtaining step of obtaining, by the user terminal, the collocation list from a base station configured to manage a larger cell than a small cell managed by the small-cell base station.

The communication control method according to the second embodiment further comprises: a user informing step of informing, by the user terminal, a base station of a fact that the user terminal is present near the small-cell base station, when the user terminal has detected that the user terminal is present near the small-cell base station, the base station managing a larger cell than a small cell managed by the small-cell base station; a determining step of determining, by the base station, whether the small-cell base station present near the user terminal is of the collocated type, based on the information provided in the user informing step; and a base station informing step of informing, by the base station, the user terminal of a fact that the small-cell base station determined in the determining step is of the collocated type, and in the recognizing step, the user terminal recognizes that the small-cell base station is of the collocated type, based on the information provided in the base station informing step.

In the communication control method according to the second embodiment, in the detecting step, the user terminal detects that the user terminal is present near the small-cell base station, by receiving a cell identifier from the small-cell base station, and in the user informing step, the user terminal informs the base station of a fact that the user terminal is present near the small-cell base station, by a measurement report on received power from the small-cell base station.

In the communication control method according to the second embodiment, in the detecting step, the user terminal detects that the user terminal is present near the small-cell base station, based on location information included in a whitelist about a specific cell to which the user terminal has an access right, and in the user informing step, the user terminal informs the base station of a fact that the user terminal is present near the small-cell base station, by proximity indication indicating that the user terminal is present near the specific cell.

The communication control method according to another embodiment further comprises an informing step of informing, by the small-cell base station, the user terminal of a fact that the small-cell base station is of the collocated type, and in the recognizing step, the user terminal recognizes that the small-cell base station is of the collocated type, when the user terminal is connected to the small-cell base station and has received the information provided in the informing step.

In the communication control method according to another embodiment, in the informing step, when the small-cell base station is directly connected to the wireless LAN access point, the small-cell base station transmits information designating a channel to perform the scanning together with the information provided in the informing step.

A user terminal according to the embodiments comprises a controller configured to perform control to detect that the user terminal is present near a small-cell base station, the controller performs control to recognize that the small-cell base station is of a collocated type where the small-cell base station is disposed at a same location as a wireless LAN access point, and the controller performs control to start scanning for discovery of the wireless LAN access point, when the controller has recognized that the small-cell base station is of the collocated type and has not discovered the wireless LAN access point.

A processor according to the embodiments is a processor for controlling a user terminal, and performs a process of detecting that the user terminal is present near a small-cell base station; a process of recognizing that the small-cell base station is of a collocated type where the small-cell base station is disposed at a same location as a wireless LAN access point; and a process of starting scanning for discovery of the wireless LAN access point, when the processor has recognized that the small-cell base station is of the collocated type and has not discovered the wireless LAN access point.

Note that, in this specification, cases in which a wireless terminal has not discovered a wireless LAN access point include a case in which a wireless LAN access point has not been discovered because the wireless LAN communication unit is in an off state, and a case in which a wireless LAN access point has not been discovered because, though the wireless LAN communication unit is in an on state, scanning is stopped.

Hereinafter, with reference to the accompanying drawings, the following description will be provided for each embodiment in a case where a cellular communication system (hereinafter, an "LTE system") configured in compliance with 3GPP standards is allowed to cooperate with a wireless LAN (WLAN) system.

[First Embodiment]
(System Configuration)

Figure 1:
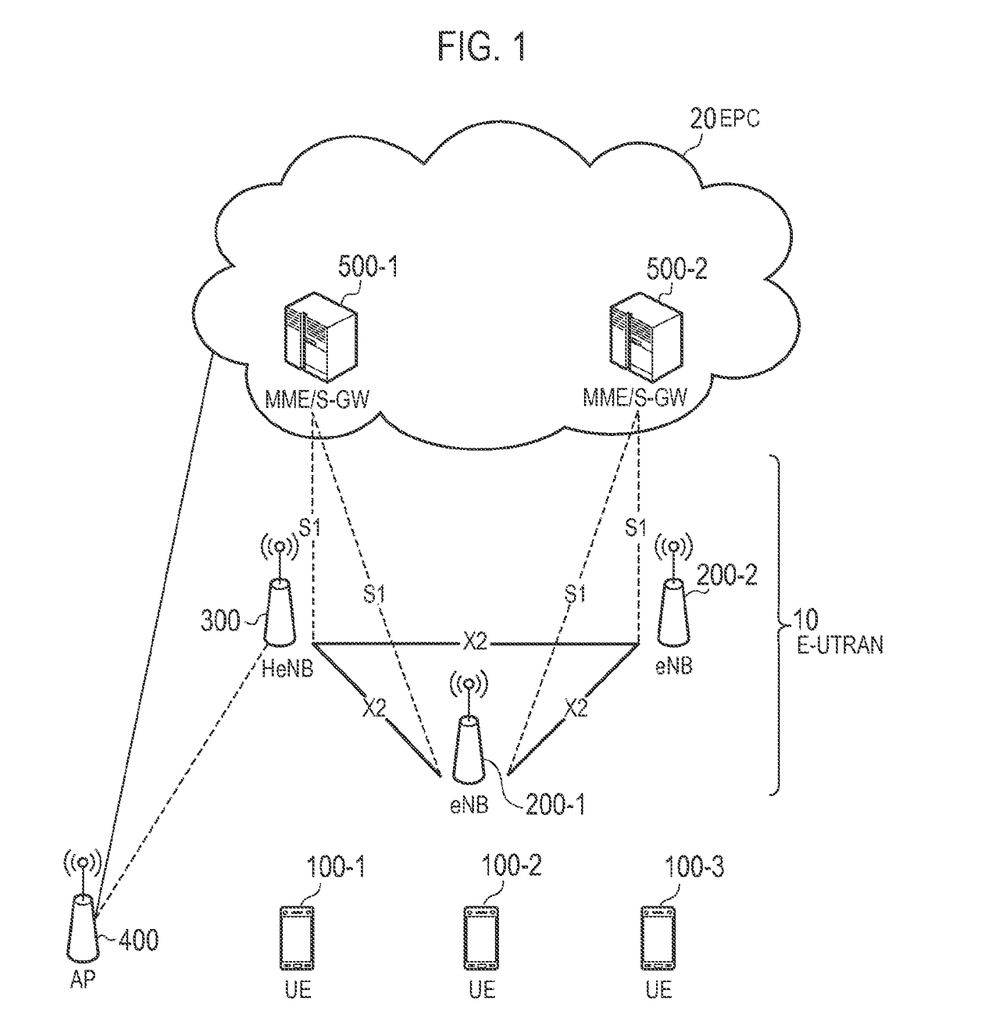
FIG. 1 is a system configuration diagram according to a first embodiment and a second embodiment.

FIG. 1 is a configuration diagram of a system according to the first embodiment. As illustrated in FIG. 1, the cellular communication system includes a plurality of UEs (User Equipments) 100, E-UTRAN (Evolved Universal Terrestrial Radio Access Network) 10, and EPC (Evolved Packet Core) 20. The E-UTRAN 10 corresponds to a radio access network. The EPC 20 corresponds to a core network.

The UE 100 is a mobile radio communication device and performs radio communication with a cell with which a connection is established. The UE 100 corresponds to the user terminal. The UE 100 is a terminal (a dual terminal) supporting communication methods of both cellular communication and WLAN communication.

The E-UTRAN 10 includes an eNB 200 (evolved Node-Bs) and a HeNB 300 (Home evolved Node-B). The eNB 200 corresponds to a cellular base station.

The eNB 200 manages one or a plurality of cells (large cell(s)) and performs radio communication with the UE 100 having established a connection (RRC connection) with the cell. It is noted that the "cell" is used as a term indicating a minimum unit of a radio communication area, and is also used as a term indicating a function of performing radio communication with the UE 100. In addition, the eNB 200, for example, has a radio resource management (RRM) function, a routing function of user data, and a measurement control function for mobility control and scheduling.

The eNBs 200 are connected mutually via an X2 interface. Furthermore, the eNB 200 is connected to the MME/S-GW 300 included in the EPC 20 via an S1 interface.

The HeNB 300 manages a specific cell (small cell) having a narrower range of coverage than the large cell. The HeNB 300 performs radio communication with a UE 100 having established a connection (RRC connection) with the specific cell.

The specific cell is referred to as a "CSG cell", "hybrid cell", or "open cell", according to an access mode to be set.

The CSG cell is a cell that can be accessed only by UEs 100 having an access right thereto (referred to as "member UEs"), and broadcasts a CSG ID. Each UE 100 holds a CSG ID list (whitelist) of CSG cells to which the UE 100 has the access right, and determines whether the UE 100 has the access right based on the whitelist and the CSG ID which is broadcast by the CSG cell.

The hybrid cell is a cell where member UEs are treated more advantageously than non-member UEs, and broadcasts, in addition to a CSG ID, information indicating that the cell is also released to the non-member UEs. Each UE 100 determines whether the UE 100 has the access right based on a whitelist and the CSG ID which is broadcast by the hybrid cell.

The open cell is a cell where regardless of whether the UEs are members or not, the UEs 100 are treated equally. The open cell does not broadcast a CSG ID. From the viewpoints of the UEs 100, the open cell is equal to a cell.

The EPC 20 includes a plurality of MMEs (Mobility Management Entities)/S-GWs (Serving-Gateways) 500.

The MME is a network node for performing various mobility controls, for example, for the UE 100 and corresponds to a control station. The S-GW is a network node that performs transfer control of user data and corresponds to a mobile switching center. The MME authenticates the UE 100 about the access right to the CSG cell.

The WLAN system includes a WLAN AP (hereinafter, referred to as an "AP") 400. The WLAN system is configured in compliance with IEEE 802.11 standards, for example. The AP 400 performs communication with the UEs 100 in a frequency band (WLAN frequency band) different from a cellular frequency band. The AP 400 is connected to the EPC 20 via a router or the like.

The HeNB 300 and the AP 400 are disposed at the same location (collocated). Therefore, the HeNB 300 is of a collocated type. For example, the collocated type HeNB 300 may be of an all-in-one type where the HeNB 300 and the AP 400 are disposed in the same casing. As one mode of being collocated, the HeNB 300 and the AP 400 may be directly connected to each other by any operator's interface. In addition, the HeNB 300 and the AP 400 may share a controller.

Next, the configurations of the UE 100, the eNB 200, the HeNB 300, and the AP 400 will be described.

Figure 2:
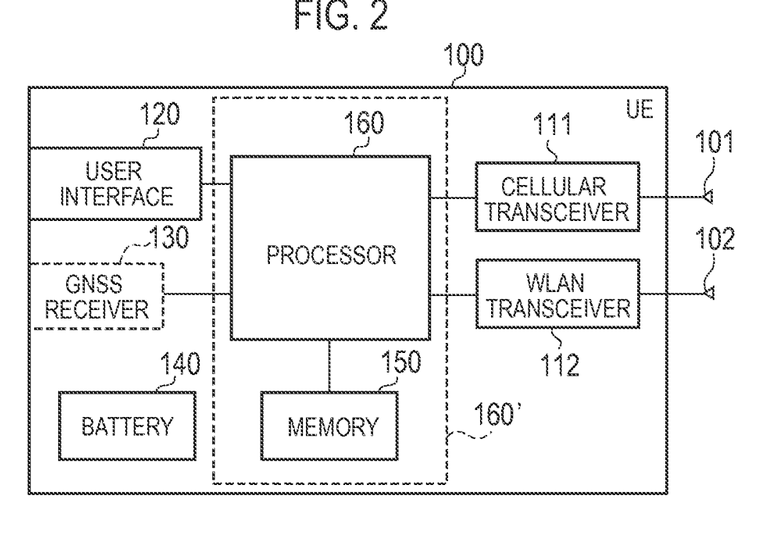
FIG. 2 is a block diagram of a UE (user terminal) according to the first embodiment and the second embodiment.

FIG. 2 is a block diagram of the UE 100. As illustrated in FIG. 2, the UE 100 has antennas 101 and 102, a cellular transceiver (a cellular communication unit) 111, a WLAN transceiver (a wireless LAN communication unit) 112, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Furthermore, the memory 150 may be integrally formed with the processor 160, and this set (that is, a chipset) may be called a processor 160' constituting a controller.

The antenna 101 and the cellular transceiver 111 are used for transmitting and receiving cellular radio signals. The cellular transceiver 111 converts a baseband signal output by the processor 160 to a cellular radio signal, and transmits it from the antenna 101. The cellular transceiver 111 also converts a cellular radio signal received by the antenna 101 to a baseband signal, and outputs it to the processor 160.

The antenna 102 and the WLAN transceiver 112 are used for transmitting and receiving WLAN radio signals. The WLAN transceiver 112 converts a baseband signal output by the processor 160 to a WLAN radio signal, and transmits it from the antenna 102. The WLAN transceiver 112 also converts a WLAN radio signal received by the antenna 102 to a baseband signal, and outputs it to the processor 160.

The WLAN transceiver 112 performs scanning for discovery of the AP 400.

The user interface 120 is an interface with a user carrying the UE 100, and includes, for example, a display, a microphone, a speaker, various buttons and the like. The user interface 120 receives an input from a user and outputs a signal indicating the content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a CPU that performs various processes by executing the program stored in the memory 150. The processor 160 may further include a codec that performs encoding and decoding of sound and video signals. The processor 160 implements various processes and various communication protocols described later.

The processor 160 performs various types of processes and various types of communication protocols which will be described later. Specifically, for example, the processor 160 controls the WLAN transceiver 112 to perform scanning. The processor 160 performs control to allow the WLAN transceiver 112 to start scanning, when the processor 160 has not discovered the AP 400 and has recognized that the HeNB 300 is of the collocated type.

Figure 3:
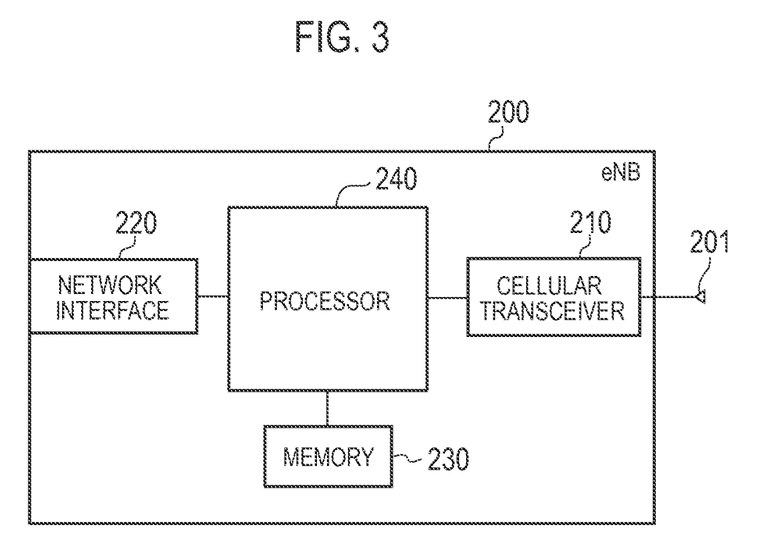
FIG. 3 is a block diagram of an eNB (cellular base station) according to the first embodiment and the second embodiment.

FIG. 3 is a block diagram of the eNB 200. As illustrated in FIG. 3, the eNB 200 has an antenna 201, a cellular transceiver 210, a network interface 220, a memory 230, and a processor 240. The memory 230 and the processor 240 constitute a controller. Note that, the memory 230 may be integrally formed with the processor 240, and this set (that is, a chipset) may be called a processor constituting a controller.

The antenna 201 and the cellular transceiver 210 are used to transmit and receive a radio signal. The cellular transceiver 210 converts a baseband signal output by the processor 240 to a cellular radio signal, and transmits it from the antenna 201. The cellular transceiver 210 also converts a cellular radio signal received by the antenna 201 to a baseband signal, and outputs it to the processor 240.

The network interface 220 is connected to a neighboring eNB 200 or a neighboring HeNB 300 via the X2 interface and is connected to the MME/S-GW 500 via the S1 interface. Further, the network interface 220 is used in communication with the AP 400 via the EPC 20.

The memory 230 stores a program to be executed by the processor 240 and information to be used for a process by the processor 240. The processor 240 includes a baseband processor that performs modulation and demodulation, encoding and decoding and the like of the baseband signal and a CPU that performs various processes by executing the program stored in the memory 230. The processor 240 implements various processes and various communication protocols described later.

Figure 4:
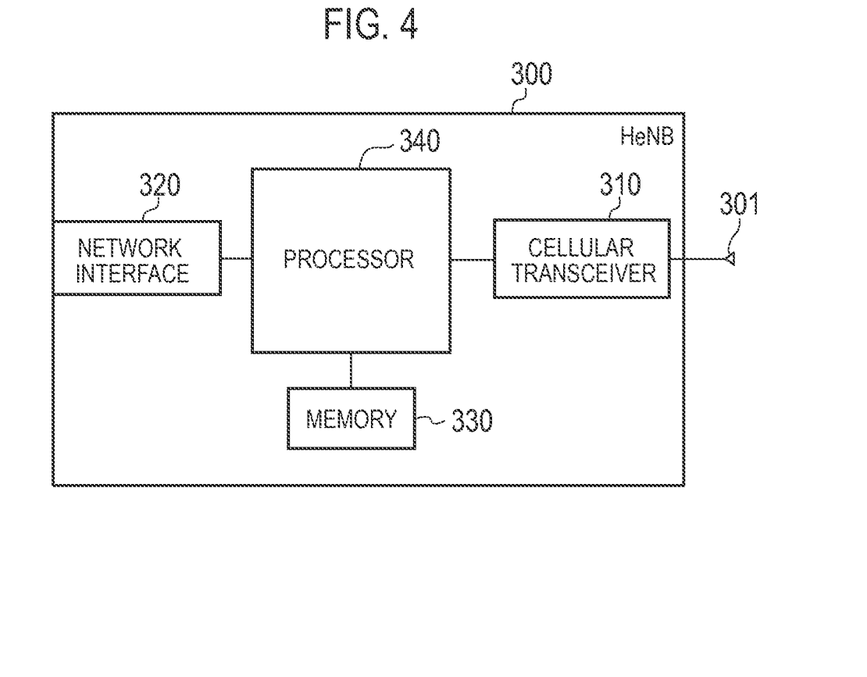
FIG. 4 is a block diagram of a HeNB according to the first embodiment and the second embodiment.

FIG. 4 is a block diagram of the HeNB 300. As illustrated in FIG. 3, the HeNB 300 has an antenna 301, a cellular transceiver 310, a network interface 320, a memory 330, and a processor 340. The memory 330 and the processor 340 constitute a controller. Note that, the memory 330 may be integrally formed with the processor 340, and this set (that is, a chipset) may be called a processor constituting a controller.

The antenna 301 and the cellular transceiver 310 are used to transmit and receive a radio signal. The cellular transceiver 310 converts a baseband signal output by the processor 340 to a cellular radio signal, and transmits it from the antenna 301. The cellular transceiver 310 also converts a cellular radio signal received by the antenna 301 to a baseband signal, and outputs it to the processor 340. In the present embodiment, the cellular transceiver 310 forms a CSG cell.

The network interface 320 is connected to a neighboring eNB 200 or a neighboring HeNB 300 via the X2 interface and is connected to the MME/S-GW 500 via the S1 interface. Further, the network interface 320 is used in communication with the AP 400 via the EPC 20.

The memory 330 stores a program to be executed by the processor 340 and information to be used for a process by the processor 340. The processor 340 includes a baseband processor that performs modulation and demodulation, encoding and decoding and the like of the baseband signal and a CPU that performs various processes by executing the program stored in the memory 330. The processor 340 implements various processes and various communication protocols described later.

Figure 5:
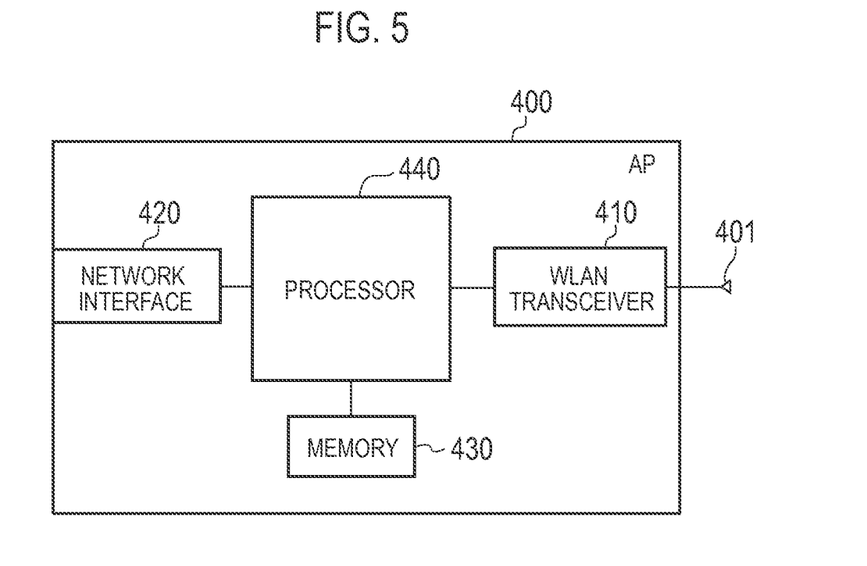
FIG. 5 is a block diagram of an AP (access point) according to the first embodiment and the second embodiment.

FIG. 5 is a block diagram of the AP 400. As illustrated in FIG. 5, the AP 400 has an antenna 401, a WLAN transceiver 410, a network interface 420, a memory 430, and a processor 440. The memory 430 and the processor 440 constitute a controller.

The antenna 401 and the WLAN transceiver 410 are used to transmit and receive a radio signal. The WLAN transceiver 410 converts a baseband signal output by the processor 440 to a cellular radio signal, and transmits it from the antenna 401. The WLAN transceiver 410 also converts a cellular radio signal received by the antenna 401 to a baseband signal, and outputs it to the processor 440.

The network interface 420 is connected to the EPC 20 via a router. Further, the network interface 420 is used in communication with the eNB 200 via the EPC 20.

The memory 430 stores a program to be executed by the processor 440 and information to be used for a process by the processor 440. The processor 440 includes a baseband processor that performs modulation and demodulation, encoding and decoding and the like of the baseband signal and a CPU that performs various processes by executing the program stored in the memory 430. The processor 440 implements various processes and various communication protocols described later.

Note that the memory 430 may be integrally formed with the processor 440, and this set (that is, a chipset) may be called a processor constituting a controller.

Figure 6:
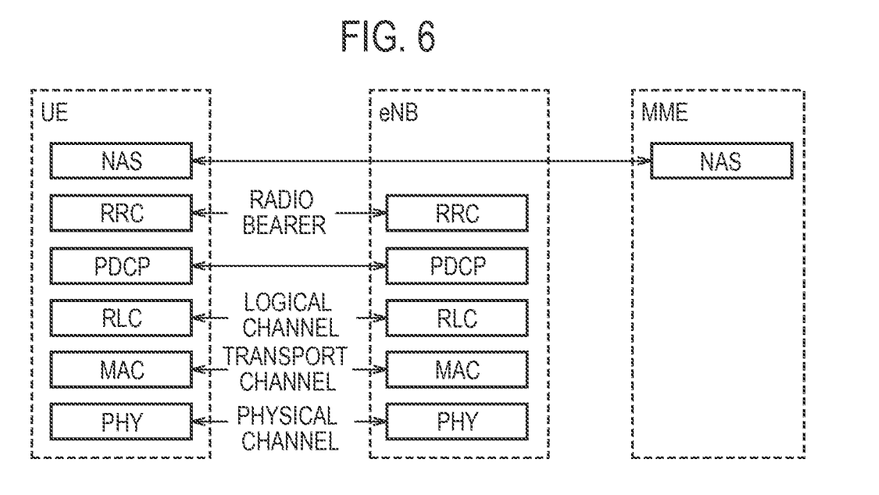
FIG. 6 is a protocol stack diagram of a radio interface of an LTE system.

FIG. 6 is a protocol stack diagram of a radio interface in the cellular communication system. As illustrated in FIG. 6, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme and the like) and a scheduler for selecting a resource block to be assigned.

The RLC layer transmits data to an RLC layer of a reception side by using the functions of the MAC layer and the physical layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted.

The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in a connected state (RRC connected state), and when the RRC connection is not established, the UE 100 is in an idle state (RRC idle state).

A NAS (Non-Access Stratum) layer positioned above the RRC layer performs session management and mobility management, for example.

Figure 7:
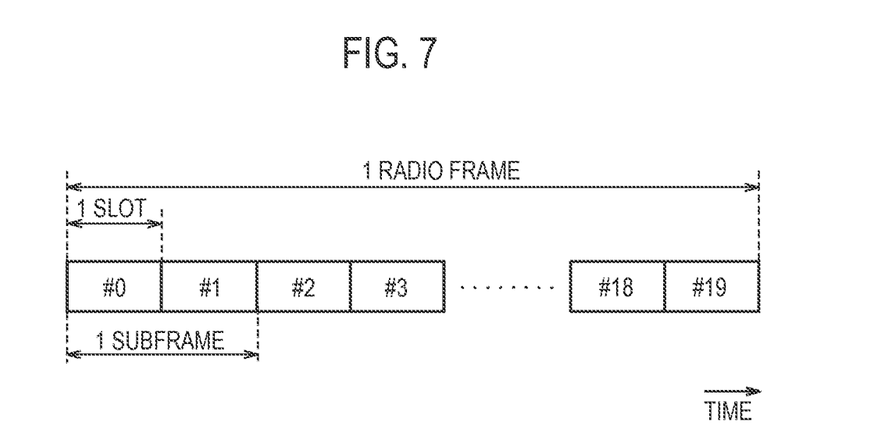
FIG. 7 is a configuration diagram of a radio frame used in the LTE system.

FIG. 7 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As shown in FIG. 7, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

(Collocated AP List)

In the present embodiment, each UE 100 has a collocated AP list (collocation list). The UE 100 and an eNB 200 share the collocated AP list.

The collocated AP list includes a cell ID of a small cell managed by the HeNB 300 of the collocated type which is disposed at the same location as the AP 400; and location information of the HeNB 300.

Each UE 100 obtains a collocated AP list from an eNB 200. For example, the UE 100 receives a collocated AP list from an eNB 200 at timing when establishing a connection, or when performing a handover, or when changing a paging area.

The eNB 200 may transmit a collocated AP list to the UE 100, based on capability information indicating that the UE 100 supports communication methods of both the cellar communication and the WLAN communication.

(Operation According to the First Embodiment)

Figure 8:
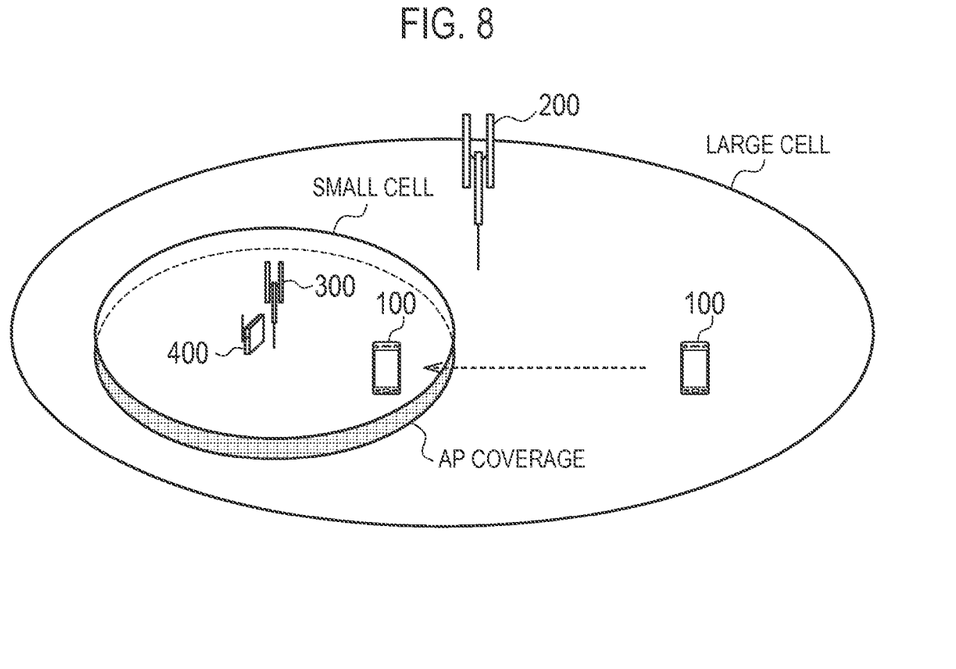
FIG. 8 is a diagram showing a positional relationship between a UE 100, an eNB 200, a HeNB 300, and an AP 400.
Figure 9:
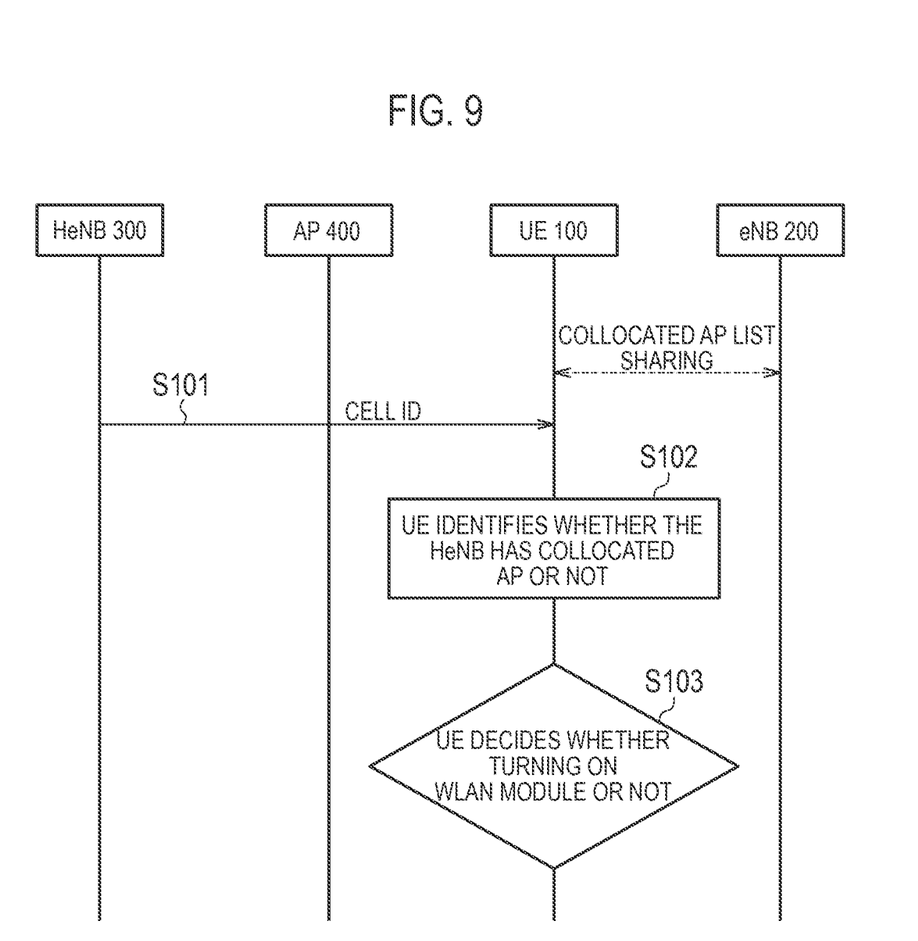
FIG. 9 is a sequence diagram for describing operation according to the first embodiment.

Next, operation according to the first embodiment will be described using FIGS. 8 and 9. FIG. 8 is a diagram showing a positional relationship between a UE 100, an eNB 200, a HeNB 300, and an AP 400. FIG. 9 is a sequence diagram for describing operation according to the first embodiment.

As shown in FIG. 8, the UE 100 exists in a large cell managed by the eNB 200. In addition, the HeNB 300 and the AP 400 are disposed at the same location. Namely, the HeNB 300 is of the collocated type. Coverage of a small cell managed by the HeNB 300 and coverage of the AP 400 overlap each other at least partially, and have comparable sizes. In addition, the coverage of the small cell and the coverage of the AP are included in the coverage of the large cell.

In the present embodiment, the eNB 200 and the HeNB 300 operate in the same frequency band. In addition, in the present embodiment, description is made assuming that the UE 100 moves in a direction of the HeNB 300 and enters the coverage of the small cell (and the coverage of the AP 400). Therefore, the UE 100 has not discovered the AP 400.

Note that the WLAN transceiver 112 of the UE 100 is in an off state.

As shown in FIG. 9, the UE 100 shares a collocated AP list with the eNB 200. Namely, the UE 100 has a collocated AP list.

As shown in FIG. 9, at step S101, the HeNB 300 broadcasts a reference signal including a cell ID. The UE 100 receives the reference signal. Therefore, the UE 100 detects that the UE 100 is present near the HeNB 300.

At step S102, the UE 100 identifies whether the HeNB 300 having transmitted the reference signal is of the collocated type. Specifically, the UE 100 checks whether a cell ID included in the collocated AP list matches the cell ID included in the reference signal.

If a cell ID included in the collocated AP list matches the cell ID included in the reference signal, the UE 100 identifies that the HeNB 300 is of the collocated type. Namely, the UE 100 recognizes that the HeNB 300 is of the collocated type.

On the other hand, if a cell ID included in the collocated AP list does not match the cell ID included in the reference signal, the UE 100 identifies that the HeNB 300 is not of the collocated type. Namely, the UE 100 recognizes that the HeNB 300 is not of the collocated type.

At step S103, the UE 100 decides whether to switch the WLAN transceiver 112 (WLAN module) to an on state.

If the HeNB 300 is of the collocated type, the UE 100 switches the WLAN transceiver 112 from an off state to an on state. On the other hand, if the HeNB 300 is not of the collocated type, the UE 100 maintains the WLAN transceiver 112 in an off state.

By switching the WLAN transceiver 112 to an on state, the UE 100 places a scanning function in an on state to start scanning for discovery of the AP 400.

(Operation According to a Variant of the First Embodiment)

Figure 10:
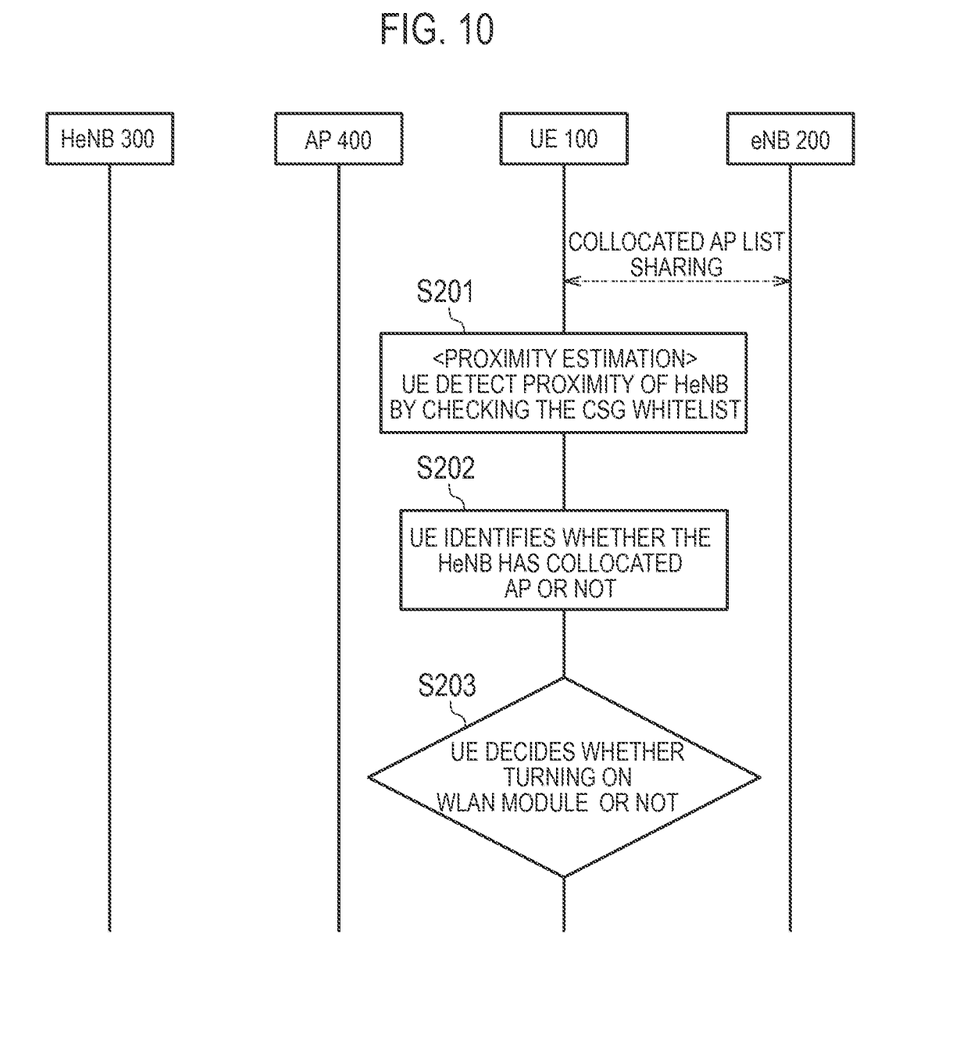
FIG. 10 is a sequence diagram for describing operation according to a variant of the first embodiment.

Next, operation according to a variant of the first embodiment will be described using FIG. 10. FIG. 10 is a sequence diagram for describing operation according to a variant of the first embodiment.

In the present variant, the eNB 200 and the HeNB 300 operate in different frequency bands. Therefore, the UE 100 cannot receive a reference signal which is broadcast from the HeNB 300.

In addition, in the present variant, the UE 100 has a whitelist (CSG white list) including location information of a CSG cell to which the UE 100 has an access right; and a cell ID of the CSG cell.

Note that, as with the above-described first embodiment, description is made assuming that the UE 100 moves in the direction of the HeNB 300 and enters the coverage of the small cell (and the AP coverage). Note also that other conditions are the same as those of the above-described first embodiment.

As shown in FIG. 10, the UE 100 shares a collocated AP list with the eNB 200.

As shown in FIG. 10, at step S201, the UE 100 detects that the UE 100 has come in proximity to the HeNB 300, based on the whitelist (Proximity Estimation). Therefore, the UE 100 detects that the UE 100 is present near the HeNB 300.

At step S202, the UE 100 checks whether a cell ID included in the collocated AP list matches the cell ID of the CSG cell included in the whitelist.

If a cell ID included in the collocated AP list matches the cell ID of the CSG cell included in the whitelist, the UE 100 identifies that the HeNB 300 is of the collocated type. Namely, the UE 100 recognizes that the HeNB 300 is of the collocated type.

On the other hand, if a cell ID included in the collocated AP list does not match the cell ID of the CSG cell included in the whitelist, the UE 100 identifies that the HeNB 300 is not of the collocated type. Namely, the UE 100 recognizes that the HeNB 300 is not of the collocated type.

Step S203 corresponds to step S103 in FIG. 9.

(Summary of the First Embodiment)

In the present embodiment, a UE 100 detects that the UE 100 is present near the HeNB 300. In addition, when the UE 100 has not discovered the AP 400 and has recognized that the HeNB 300 is of the collocated type, the UE 100 starts scanning for discovery of the AP 400. Therefore, when the AP 400 is present near the UE 100 located near the HeNB 300, scanning can start and thus the AP 400 can be efficiently discovered.

In the present embodiment, the UE 100 recognizes, based on a collocated AP list, that the HeNB 300 is of the collocated type. Therefore, even when the UE 100 is not connected to an eNB 200, the UE 100 can efficiently discover the AP 400.

In the present embodiment, when the eNB 200 and the HeNB 300 operate in the same frequency band, the UE 100 detects that the UE 100 is present near the HeNB 300 by receiving a cell ID from the HeNB 300. Therefore, the UE 100 can detect that the UE 100 is present near the HeNB 300 only by receiving a reference signal including a cell ID of the HeNB 300.

In the present embodiment, when the eNB 200 and the HeNB 300 operate in different frequency bands, the UE 100 detects that the UE 100 is present near the HeNB 300, based on location information included in a whitelist. Therefore, even if the eNB 200 and the HeNB 300 operate in different frequency bands, the UE 100 can detect that the UE 100 is present near the HeNB 300.

In the present embodiment, the UE 100 obtains a collocated AP list from the eNB 200. Therefore, even when the UE 100 is not connected to the eNB 200, the UE 100 can efficiently discover the AP 400.

[Second Embodiment]

(Operation According to a Second Embodiment)

Figure 11:
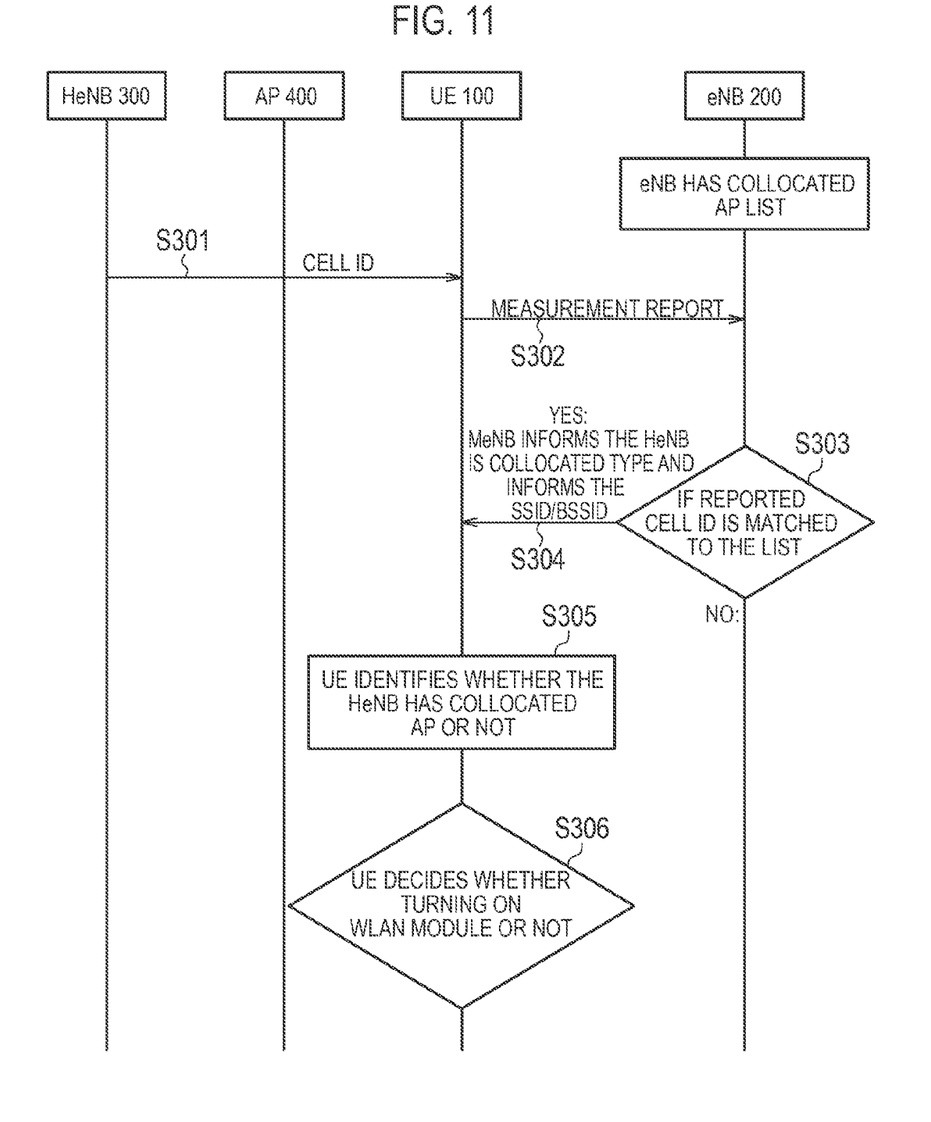
FIG. 11 is a sequence diagram for describing operation according to the second embodiment.

Next, operation according to the second embodiment will be described using FIG. 11. FIG. 11 is a sequence diagram for describing operation according to the second embodiment.

In the first embodiment, a UE 100 determines whether an HeNB 300 is of a collocated type, using a collocated AP list. In the present embodiment, an eNB 200 determines whether the HeNB 300 is of the collocated type, using a collocated AP list. Therefore, the eNB 200 has a collocated AP list, and the UE 100 does not have a collocated AP list.

In the present embodiment, the eNB 200 and the HeNB 300 operate in the same frequency band. In addition, in the present embodiment, description is made assuming that the UE 100 moves in a direction of the HeNB 300 and enters coverage of a small cell (and AP coverage). In addition, other conditions are the same as those of the above-described first embodiment.

As shown in FIG. 11, at step S301, the HeNB 300 broadcasts a reference signal including a cell ID. The UE 100 receives the reference signal. Therefore, the UE 100 detects that the UE 100 is present near the HeNB 300.

At step S302, the UE 100 transmits a measurement report on received power of the reference signal, to the eNB 200. The eNB 200 receives the measurement report. By the measurement report, the UE 100 informs the eNB 200 of the fact that the UE 100 is present near the HeNB 300. The measurement report includes the cell ID of the HeNB 300 which is included in the reference signal.

At step S303, the eNB 200 determines whether the cell ID included in the measurement report matches a cell ID in the collocated AP list. Namely, the eNB 200 identifies whether the HeNB 300 having transmitted the reference signal is of the collocated type.

At step S304, if the cell ID included in the measurement report matches a cell ID in the collocated AP list (if Yes), the eNB 200 informs the UE 100 of the fact that the HeNB 300 is of the collocated type. In addition, the eNB 200 informs of an identifier (e.g., SSID (Service Set Identifier) or BSSID (Basic Service Set Identifier)) of an AP 400 disposed at the same location as the HeNB 300.

On the other hand, if the cell ID included in the measurement report does not match a cell ID in the collocated AP list (if No), the eNB 200 ends the process.

At step S305, the UE 100 identifies that the HeNB 300 is of the collocated type, by the information provided from the eNB 200 that the HeNB 300 is of the collocated type.

Step S306 corresponds to step S103 in FIG. 9.

Note that when the UE 100 has switched a scanning function to an on state, the UE 100 may perform scanning based on the identifier of the AP 400.

(Variant of the Second Embodiment)

Figure 12:
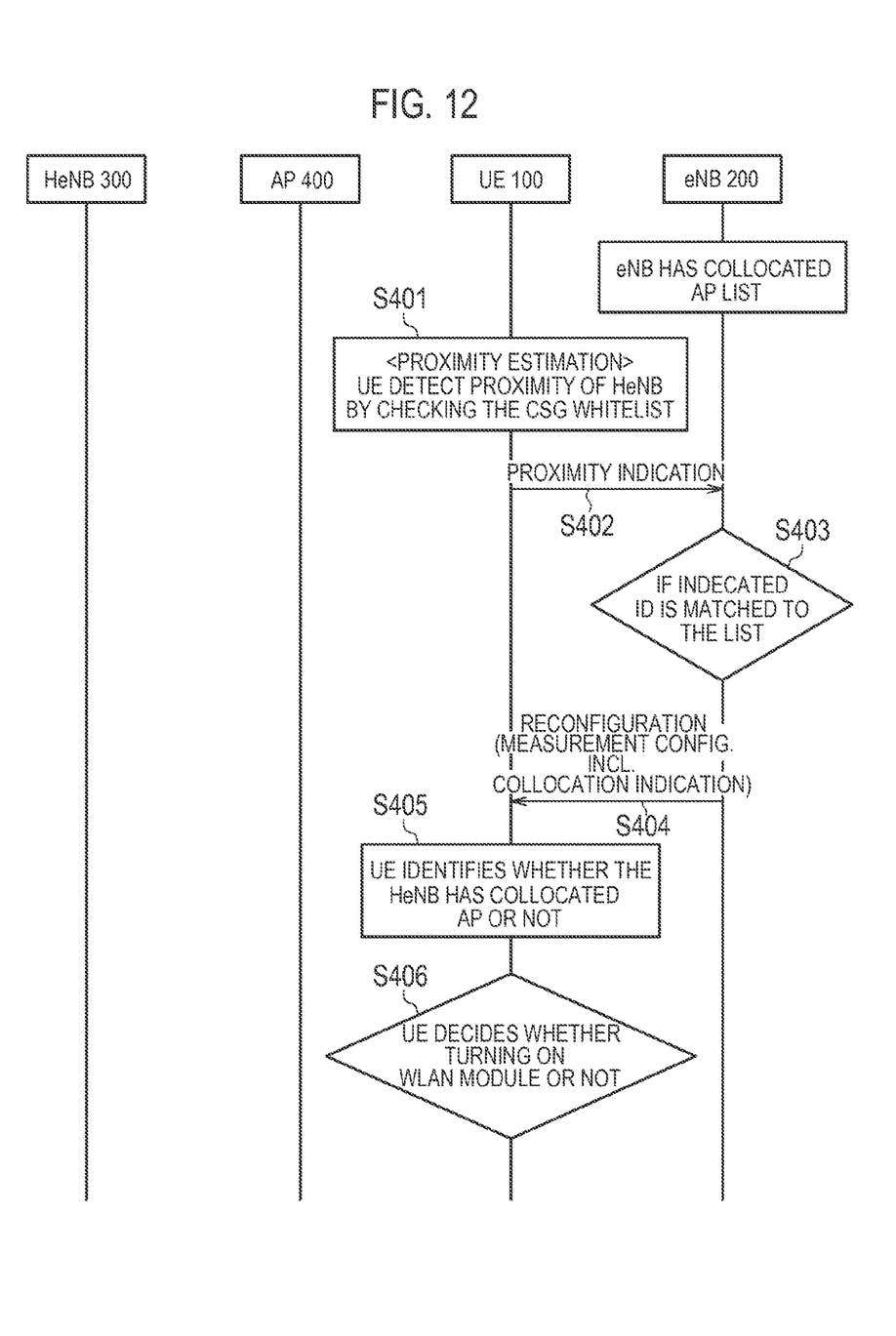
FIG. 12 is a sequence diagram for describing operation according to a variant of the second embodiment.

Next, operation according to a variant of the second embodiment will be described using FIG. 12. FIG. 12 is a sequence diagram for describing operation according to a variant of the second embodiment.

In the present variant, as with the variant according to the first embodiment, the eNB 200 and the HeNB 300 operate in different frequency bands. Therefore, the UE 100 cannot receive a reference signal from the HeNB 300. In addition, in the present embodiment, description is made assuming that the UE 100 moves in the direction of the HeNB 300 and enters the coverage of the small cell (and the AP coverage). In addition, other conditions are the same as those of the above-described second embodiment.

Step S401 in FIG. 12 corresponds to step S201 in FIG. 10.

As shown in FIG. 12, at step S402, the UE 100 transmits proximity information (Proximity Indication) indicating that the UE 100 is present near a CSG cell, to the eNB 200. The eNB 200 receives the proximity information. The proximity information includes a cell ID of the CSG cell.

At step S403, the eNB 200 determines whether the cell ID included in the proximity information matches a cell ID in the collocated AP list. Namely, the eNB 200 identifies whether the HeNB 300 present in proximity to the UE 100 is of the collocated type.

At step S404, if the cell ID included in the proximity information matches a cell ID in the collocated AP list, the eNB 200 performs collocation information (Collocation Indication) indicating that the HeNB 300 is of the collocated type. The UE 100 receives the collocation information.

In the present embodiment, the eNB 200 transmits reconfiguration information (Reconfiguration) including the collocation information. In addition, the reconfiguration information includes measurement configuration (measurement config.), in addition to the collocation information.

Note that the eNB 200 may transmit the collocation information and the reconfiguration information separately.

On the other hand, if the cell ID included in the proximity information does not match a cell ID in the collocated AP list, the eNB 200 does not transmit collocation information.

At step S405, the UE 100 identifies that the HeNB 300 is of the collocated type, based on the collocation information.

Step S406 corresponds to step S103 in FIG. 9.

(Summary of the Second Embodiment)

In the present embodiment, an eNB 200 informs a UE 100 of the fact that the HeNB 300 is of the collocated type. Therefore, the UE 100 does not need to perform a process for checking whether the HeNB 300 is of the collocated type, based on a collocated AP list, and thus, the processing load of the UE 100 can be reduced.

In the present embodiment, when the eNB 200 and the HeNB 300 operate in the same frequency band, the UE 100 informs the eNB 200 of the fact that the UE 100 is present near the HeNB 300, by a measurement report on received power from the HeNB 300. In addition, when the eNB 200 and the HeNB 300 operate in different frequency bands, the UE 100 informs the eNB 200 of the fact that the UE 100 is present near the HeNB 300, by proximity information. Therefore, the UE 100 does not need to provide another information for informing of the fact that the UE 100 is present near the HeNB 300, and thus, the processing load of the UE 100 can be reduced.

[Other Embodiments]

Although in the above-described second embodiment the eNB 200 identifies whether the HeNB 300 is of the collocated type, the configuration is not limited thereto. A higher-level apparatus of the eNB 200 (e.g., MME) may identify whether the HeNB 300 is of the collocated type. In this case, the higher-level apparatus of the eNB 200 has a collocated AP list.

In addition, although in the above-described variant of the second embodiment the eNB 200 transmits collocation information together with reconfiguration information to the UE 100, the configuration is not limited thereto. Instead of the collocation information, the eNB 200 may transmit an identifier of the AP 400 to the UE 100. In this case, the UE 100 can turn on the scanning function and start scanning for discovery of the transmitted identifier of the AP 400, at a point in time when a measurement trigger is applied.

In addition, although in the above-described embodiments scanning starts by switching the WLAN transceiver 112 from an off state to an on state, the configuration is not limited thereto. For example, when the UE 100 with a WLAN being in an on state and with the scanning function being in an off state has recognized that the HeNB 300 is of the collocated type, the UE 100 may switch the scanning function to an on state. Therefore, the UE 100 starts scanning. In addition, when the scanning function is in an on state but scanning is stopped (e.g., when the scanning function having selected a mode in which scanning is performed periodically or a mode in which scanning starts based on a specific event is in an on state), the UE 100 may resume (start) scanning using, as a trigger, the fact that the UE 100 has recognized that the HeNB 300 is of the collocated type.

In addition, although in the above-described embodiments the HeNB 300 is described as an example of a small-cell base station, the configuration is not limited thereto. For example, the small-cell base station may be a femtocell or a picocell that manages a small cell.

In addition, although in the above-described embodiments description is separately made of a case in which the eNB 200 and the HeNB 300 operate in the same frequency band and a case in which the eNB 200 and the HeNB 300 operate in different frequency bands, even in the case in which the eNB 200 and the HeNB 300 operate in different frequency bands, if the UE 100 can receive a reference signal from the eNB 200 (or HeNB 300) that manages a cell in a different frequency band than that of a cell where the UE 100 exists, then the UE 100 may perform the processes of the above-described embodiments based on the received reference signal.

In addition, when the UE 100 is connected to the HeNB 300, the HeNB 300 may inform the UE of the fact that the HeNB 300 is of the collocated type, by broadcast or unicast. Therefore, the UE 100 recognizes that the HeNB 300 is of the collocated type. Therefore, the UE 100 does not need to perform a process for checking whether the HeNB 300 is of the collocated type, based on a collocated AP list, and thus, the processing load of the UE 100 can be reduced.

In addition, when the eNB 200 is directly connected to the AP 400, the eNB 200 may transmit information designating a channel to perform, by the UE 100, scanning for discovery of the AP 400 together with the information of the fact that the eNB 200 is of the collocated type. Therefore, the UE 100 can efficiently discovery the AP by performing scanning based on the information designating the channel.

In addition, the eNB 200 may transmit the measurement configuration (measurement config.) to the UE 100 so that a measurement report is performed only when a small cell present in a collocated AP list has been recognized. In this case, the eNB 200 can inform the UE 100 of an identifier of the AP 400 immediately after receiving a measurement report from the UE 100.

In addition, the collocated AP list may include, in addition to a cell ID of a small cell, information indicating an identifier of the AP 400 disposed at the same location as the HeNB 300 which is of the collocated type. When the UE 100 has recognized that the HeNB 300 is of the collocated type, the UE 100 may perform scanning based on the identifier of the AP 400 associated with the recognized HeNB 300.

In addition, in the above-described embodiments, the LTE system is described as one example of the cellular communication system; however, the configuration is not limited to the LTE system, and the present invention may be applied to a cellular communication system other than the LTE system.

In addition, the entire content of Japanese Patent Application No. 2013-100781 (filed on May 10, 2013) is incorporated in the present specification by reference.

INDUSTRIAL APPLICABILITY

As described above, the communication control method, the user terminal, and the processor according to the present invention in which the user terminal having the cellular communication unit and the wireless LAN communication unit can efficiency discover the access point, and thus they are useful for a mobile communication field.

The invention claimed is:

1. A communication control method for allowing a cellular communication system to cooperate with a wireless LAN system, the communication control method comprising:
   a detecting step of detecting, by a user terminal, that the user terminal is present near a small-cell base station;
   a recognizing step of recognizing, by the user terminal, that the small-cell base station is of a collocated type where the small-cell base station is disposed at a same location as a wireless LAN access point; and
   a scanning starting step of starting, by the user terminal, scanning for discovery of the wireless LAN access point, when the user terminal has recognized that the small-cell base station is of the collocated type and has not discovered the wireless LAN access point,
   in the recognizing step, the user terminal recognizes that the small-cell base station is of the collocated type, based on a collocation list about a small-cell base station of the collocated type,
   in the detecting step, the user terminal detects that the user terminal is present near the small-cell base station, based on location information included in a whitelist about a specific cell to which the user terminal has an access right, and
   in the recognizing step, the user terminal recognizes that the small-cell base station is of the collocated type, when a cell identifier included in the whitelist matches a cell identifier included in the collocation list.

2. The communication control method according to claim 1, wherein
   in the detecting step, the user terminal detects that the user terminal is present near the small-cell base station, by receiving a cell identifier from the small-cell base station, and
   in the recognizing step, the user terminal recognizes that the small-cell base station is of the collocated type, when the cell identifier matches a cell identifier included in the collocation list.

3. The communication control method according to claim 1, further comprising an obtaining step of obtaining, by the user terminal, the collocation list from a base station configured to manage a larger cell than a small cell managed by the small-cell base station.

4. The communication control method according to claim 1, further comprising:
   a user informing step of informing, by the user terminal, a base station of a fact that the user terminal is present near the small-cell base station, when the user terminal has detected that the user terminal is present near the small-cell base station, the base station managing a larger cell than a small cell managed by the small-cell base station;

a determining step of determining, by the base station, whether the small-cell base station present near the user terminal is of the collocated type, based on the information provided in the user informing step; and a base station informing step of informing, by the base station, the user terminal of a fact that the small-cell base station determined in the determining step is of the collocated type, wherein in the recognizing step, the user terminal recognizes that the small-cell base station is of the collocated type, based on the information provided in the base station informing step.

5. The communication control method according to claim 4, wherein in the detecting step, the user terminal detects that the user terminal is present near the small-cell base station, by receiving a cell identifier from the small-cell base station, and in the user informing step, the user terminal informs the base station of a fact that the user terminal is present near the small-cell base station, by a measurement report on received power from the small-cell base station.

6. The communication control method according to claim 4, wherein in the user informing step, the user terminal informs the base station of a fact that the user terminal is present near the small-cell base station, by proximity indication indicating that the user terminal is present near the specific cell.

7. The communication control method according to claim 1, further comprising an informing step of informing, by the small-cell base station, the user terminal of a fact that the small-cell base station is of the collocated type, wherein in the recognizing step, the user terminal recognizes that the small-cell base station is of the collocated type, when the user terminal is connected to the small-cell base station and has received the information provided in the informing step.

8. The communication control method according to claim 7, wherein in the informing step, when the small-cell base station is directly connected to the wireless LAN access point, the small-cell base station transmits information designating a channel to perform the scanning together with the information provided in the informing step.

9. A user terminal, comprising a controller configured to perform control to detect that the user terminal is present near a small-cell base station, wherein the controller performs control to recognize that the small-cell base station is of a collocated type where the small-cell base station is disposed at a same location as a wireless LAN access point, the controller performs control to start scanning for discovery of the wireless LAN access point, when the controller has recognized that the small-cell base station is of the collocated type and has not discovered the wireless LAN access point, the controller performs control to recognize that the small-cell base station is of the collocated type, based on a collocation list about a small-cell base station of the collocated type, the controller performs control to detect that the user terminal is present near the small-cell base station, based on location information included in a whitelist about a specific cell to which the user terminal has an access right, and the controller performs control to recognize that the small-cell base station is of the collocated type, when a cell identifier included in the whitelist matches a cell identifier included in the collocation list.

10. A processor for controlling a user terminal, the processor performing:

a process of detecting that the user terminal is present near a small-cell base station;

a process of recognizing that the small-cell base station is of a collocated type where the small-cell base station is disposed at a same location as a wireless LAN access point; and a process of starting scanning for discovery of the wireless LAN access point, when the processor has recognized that the small-cell base station is of the collocated type and has not discovered the wireless LAN access point, wherein the process of recognizing that the small-cell base station is of the collocated type, based on a collocation list about a small-cell base station of the collocated type, the process of detecting that the user terminal is present near the small-cell base station, based on location information included in a whitelist about a specific cell to which the user terminal has an access right, and the process of recognizing that the small-cell base station is of the collocated type, when a cell identifier included in the whitelist matches a cell identifier included in the collocation list.

* * * * *